(12) United States Patent
Rommelmann et al.

(10) Patent No.: US 7,196,627 B2
(45) Date of Patent: Mar. 27, 2007

(54) CONTROL OF PACKAGED MODULES

(75) Inventors: Heiko Rommelmann, Penfield, NY (US); Alberto Rodriguez, Webster, NY (US); Scott J. Bell, Webster, NY (US)

(73) Assignee: Xerox Corporation, Stamford, CT (US)

( * ) Notice: Subject to any disclaimer, the term of this patent is extended or adjusted under 35 U.S.C. 154(b) by 61 days.

(21) Appl. No.: 10/849,973

(22) Filed: May 20, 2004

(65) Prior Publication Data

US 2005/0258931 A1 Nov. 24, 2005

(51) Int. Cl.
*G08B 13/14* (2006.01)
(52) U.S. Cl. .......... 340/572.8; 340/5.1; 340/572.1; 235/375; 700/225
(58) Field of Classification Search .......... 340/5.1, 340/572.8, 541, 572.1; 235/375; 700/225
See application file for complete search history.

(56) References Cited

U.S. PATENT DOCUMENTS

| | | | | |
|---|---|---|---|---|
| 5,406,263 | A * | 4/1995 | Tuttle | 340/572.1 |
| 5,528,222 | A | 6/1996 | Moskowitz et al. | 340/572 |
| 6,008,727 | A | 12/1999 | Want et al. | 340/572.1 |
| 6,028,518 | A * | 2/2000 | Rankin et al. | 340/572.1 |
| 6,176,425 | B1 | 1/2001 | Harrison et al. | 235/385 |
| 6,246,326 | B1 * | 6/2001 | Wiklof et al. | 340/572.1 |
| 6,262,662 | B1 | 7/2001 | Back et al. | 340/572.1 |
| 6,326,946 | B1 | 12/2001 | Moran et al. | 345/156 |
| 6,346,884 | B1 | 2/2002 | Uozumi et al. | 340/572.1 |
| 6,351,621 | B1 | 2/2002 | Richards et al. | 399/111 |
| 6,409,401 | B1 * | 6/2002 | Petteruti et al. | 400/88 |
| 6,584,290 | B2 | 6/2003 | Kurz et al. | 399/12 |
| 6,593,853 | B1 * | 7/2003 | Barrett et al. | 340/572.1 |

OTHER PUBLICATIONS

The Write Stuff: Understanding the Value of Read/Write RFID Functionality, Technologies Corporation, 2003, pp. 1-4.
Applications, Intermec—Authentication, Applications for Flying Null Technology, www.flying-null.com, May 20, 2003.
Flying Null, A Unique Product Identity, Flying Null Technology—the new concept in remote magnetic sensing, www.flying-null.com, May 20, 2003.

* cited by examiner

*Primary Examiner*—Anh V. La
(74) *Attorney, Agent, or Firm*—David J. Arthur (57) ABSTRACT

Processing a module packaged within a container involves securely affixing a tag comprising a tag memory and a tag communication element to the container. While the module is enclosed in the container, information pertaining to the module is selectively stored in the tag memory for later readout and processing. A container for enclosing a module includes an electronic tag having a tag memory and a tag communication element. The tag communication element is adapted to receive information from a source, and the tag memory stores that information. While the module is packaged in the container, either first module information or second module information is stored in the tag memory. The module information pertains to the subsequent use of the module. The electronic tag is embedded in the container material, or securely affixed to the container. The electronic tag may span a container opening so that the tag is damaged upon opening the container, providing security against improper re-use.

11 Claims, 6 Drawing Sheets

CONTROL OF PACKAGED MODULES

CROSS-REFERENCE TO RELATED APPLICATIONS

Reference is made to commonly-assigned copending U.S. patent application Ser. No. 10/849,686. filed concurrently herewith, now U.S. Publication No. 2005/0258962, entitled "Control of Programmable Modules," by Heiko Rommelmann et al., copending U.S. patent application Ser. No. 10/849,976, filed concurrently herewith, now U.S. Publication No. 2005/0258932, entitled "Control of Programmable Modules," by Heiko Rommelmann et al., copending U.S. patent application Ser. No. 10/850,190, filed concurrently herewith, now U.S. Publication No. 2005/0258963, entitled "Diagnosis of Programmable Modules," by Heiko Rommelmann et al., and copending U.S. patent application Ser. No. 10/849,974, filed concurrently herewith, now U.S. Publication No. 2005/0258228, entitled "Control of Programmable Modules," by Heiko Rommelmann et al., the disclosures of which are incorporated herein.

BACKGROUND

The present invention relates to monitoring devices or modules packaged within a container. In one aspect, the present invention is particularly useful in inventory control.

Various systems allow a user to track devices or packages. For example, a barcode containing a model number or a serial number or other identifying indicia can be printed on a device or a package An optical scanner connected to a tracking system can scan the barcode, so that the tracking system can determine the identity and location of the marked item. Such barcode systems rely on a "line of sight" access from the barcode reader to the barcode on the item being tracked. In addition, while the tracking system can record various information pertaining to the location and status of the tracked item, the item tracked does not itself retain any information as to where it has been, or what processing steps have been performed on it.

More recently, radio frequency transmitters have been applied to devices for tracking purposes. Such radio frequency transmitters contain information that they can transmit to a reader. The radio frequency transmitters do not require a "line of sight" access from the reader.

Magnetic tags and sensors have also been demonstrated to track and verify the identity of products. Magnetic tags require close proximity between the information bearing tag and the sensor.

SUMMARY

A method of processing a module enclosed within a container includes providing the container with an electronic tag, the tag including a tag memory. While the module is enclosed in the container, either first module information or second module information pertaining to the module is stored in the tag memory. In a particular implementation, storing either the first information or the second information in the tag memory includes selectively communicating the information over a wireless communication link.

A method of processing a module includes enclosing a module within a container, and securely affixing to the container an electronic tag comprising a tag memory. The method further includes electronically reading tag identification information from the tag memory, and electronically verifying that the read tag identification information matches predetermined identification criteria. If the read tag identification information matches the predetermined identification criteria, selectively storing in the tag memory either first module information or second module information, which module information pertains to a subsequent use of the module.

A container for enclosing a module includes an electronic tag that itself includes a tag memory, a tag identification segment for producing a tag identification response, and a tag communication element. The tag communication element is adapted to receive information from an information source. The tag memory stores the information received by the tag communication link. The tag memory is adapted to receive at least first and second information. In a particular preferred embodiment, the tag memory is adapted to receive the second information at a time different from the first information.

DETAILED DESCRIPTION

Modules, such as replacement parts or consumable elements for machinery or systems, are frequently stored and transported in containers. A particular implementation of the present invention will be described in the context of a consumable module for a printing apparatus, in particular a toner cartridge containing consumable toner. The cartridge is intended for insertion into a xerographic printing apparatus, in which toner is dispensed from the cartridge for use in the printing process. Although this one particular application is described, the person of skill in the art, having reviewed the subject disclosure, will recognize that the principles thereof can be applied to a wide variety of systems and uses. The term "module" describes any item that can or is intended to be enclosed in a container for shipping, handling, or otherwise processing.

Figure 1:
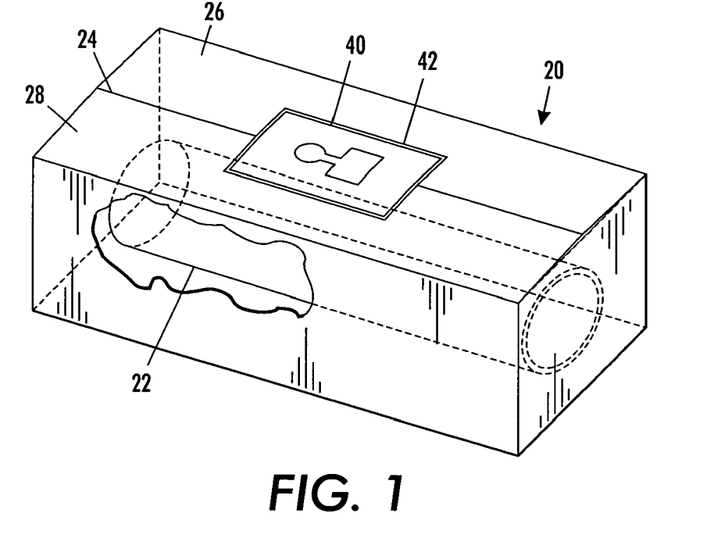
FIG. 1 shows a container incorporating an aspect of the present invention.

A container 20 encloses a module, such as a replaceable toner cartridge 22 as shown in FIG. 1. Although a rectilinear container is shown, other shapes can be used for the container. In addition to the replaceable module for the printing apparatus, the container may also enclose packing material (not shown) to protect the enclosed module. In some instances, the container may enclose multiple modules, which may be identical to one another, or may form a set of related modules.

Figure 2:
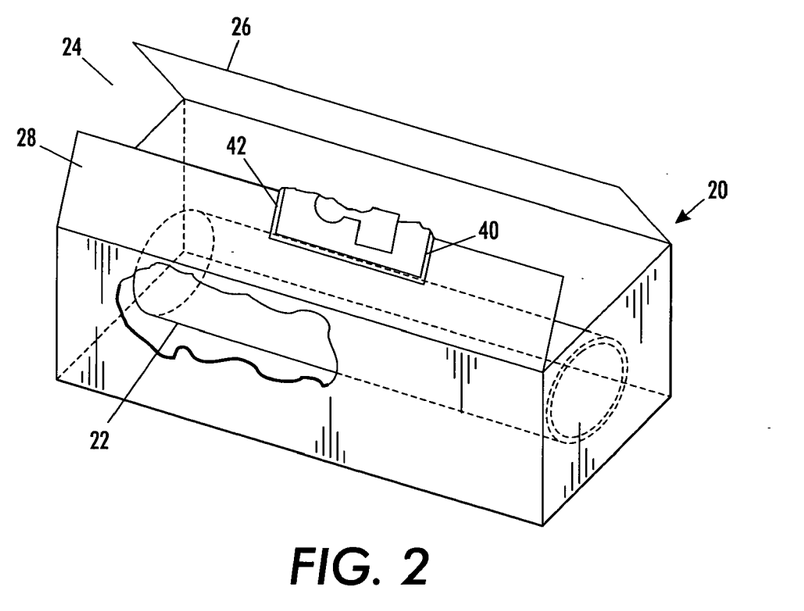
FIG. 2 shows the container of FIG. 1 after the container has been opened.
Figure 3:
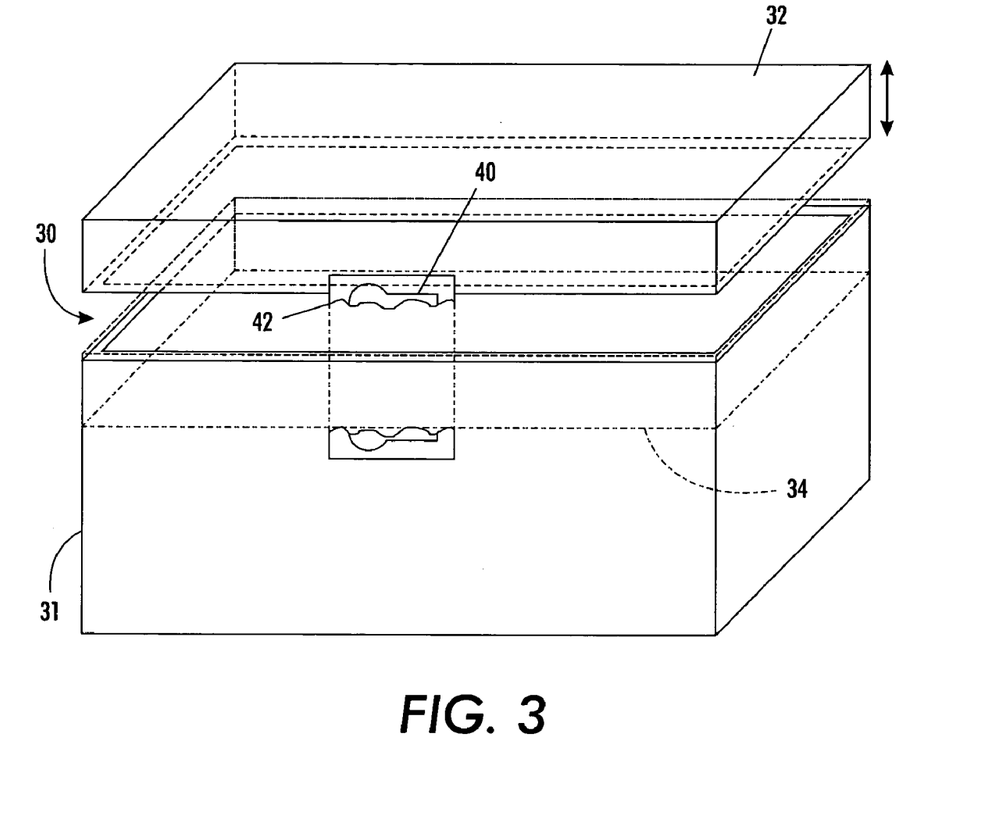
FIG. 3 shows a different container incorporating an aspect of the present invention.

One portion of the container, (shown in the embodiment of FIG. 1 as the top) has an opening separation 24 that is adapted to expand upon opening the container. In the particular implementation illustrated, the opening separation is formed in the top surface by forming the top surface as two sections 26, 28 of container material that meet at a seam. The container with the opening separation expanded to open the container is shown in FIG. 2. Those skilled in the art will be familiar with other types of opening separations. For example, the container 30 may be formed of a container body 31 with an open side and a separate piece of material to form a lid 32, having an opening separation 34 that extends around the perimeter of the lid, as shown in FIG. 3 (without the enclosed module), where the edge of the lid meets the container body. Other types of opening separations might include a pull tab that tears the container material, or that has a line of perforations to permit the pull tab to separate to sections of the container.

The container 20, 30 is formed of container material, such as cardboard, corrugated cardboard, polystyrene, or other commonly known materials.

An electronic information tag 40 is securely attached to the container. In the particular implementation illustrated, the electronic information tag is embedded in an adhesive label 42 that is securely attached to the container, preferably spanning the opening separation 24, 34.

Figure 4:
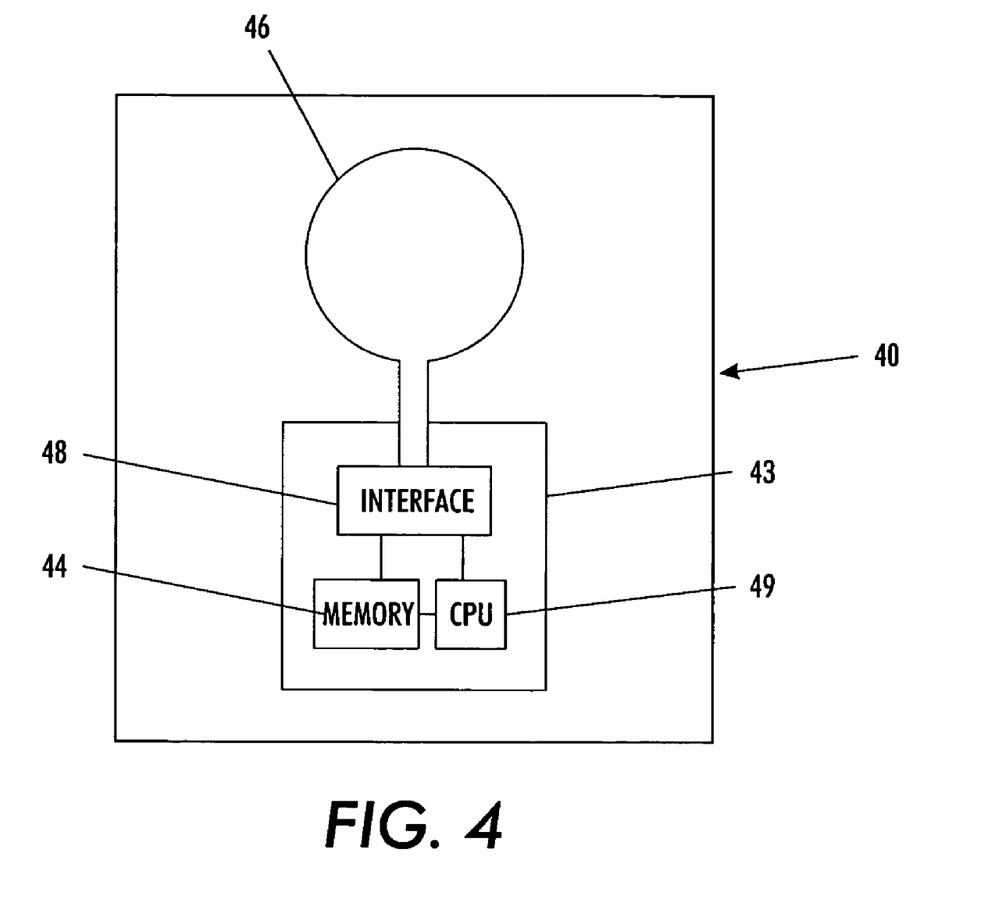
FIG. 4 shows an implementation of a tag forming an aspect of the present invention.

FIG. 4 shows schematically an exemplary electronic information tag that includes tag electronics 43 including tag memory 44 for storing information, and a tag communication element 46 for communicating information to and from the tag memory 44. The tag may also include other electronic elements, such as an interface element 48 for modulating and demodulating, or otherwise processing the signals between the tag communications element 46 and the tag memory. The tag may also include a central processing unit (CPU) 49 for performing calculations, or manipulating or otherwise handling information in the tag memory. In a particular implementation, the communication element 46 is a wireless communication element for establishing a wireless communication link with another device. In one such particular implementation, the wireless communication element is a radio frequency (RF) antenna for establishing a radio frequency communication link with another device.

The wireless communication element can be an active element, powered by a power source, such as a battery (not shown) embedded on the electronic tag 40. Alternatively, the wireless communication element can be passive. Such a passive element is energized by the RF signal it receives from another device, such as an RF reader that queries the tag, or an RF writer that delivers information to the tag. The energy in such an RF signal is sufficient to briefly power the RF antenna and interface electronics to enable the RF antenna to receive and transmit information.

Information received at the RF antenna is stored in the tag memory contained within the tag electronics. Particular information can be stored at particular locations in the tag memory. When the communication element is activated, the RF antenna can transmit selected information from the tag memory.

Figure 5:
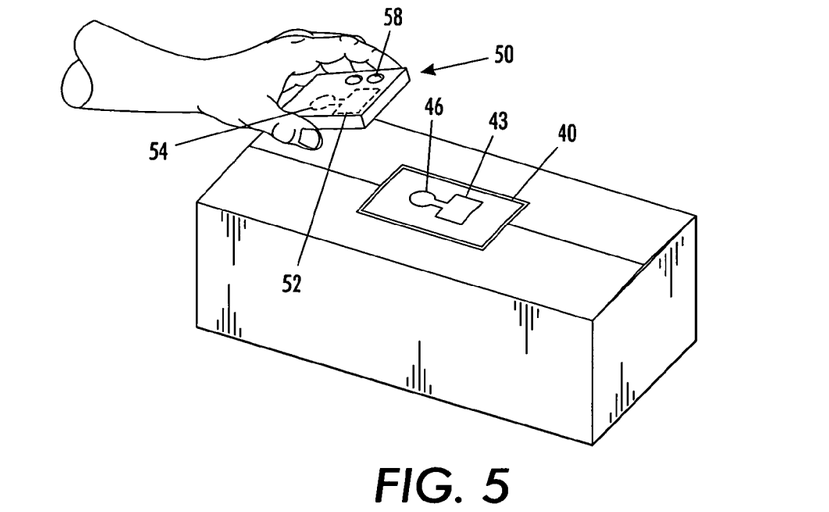
FIG. 5 shows the use of a portable tag writer or reader in accordance with an aspect of the present invention.
Figure 6:
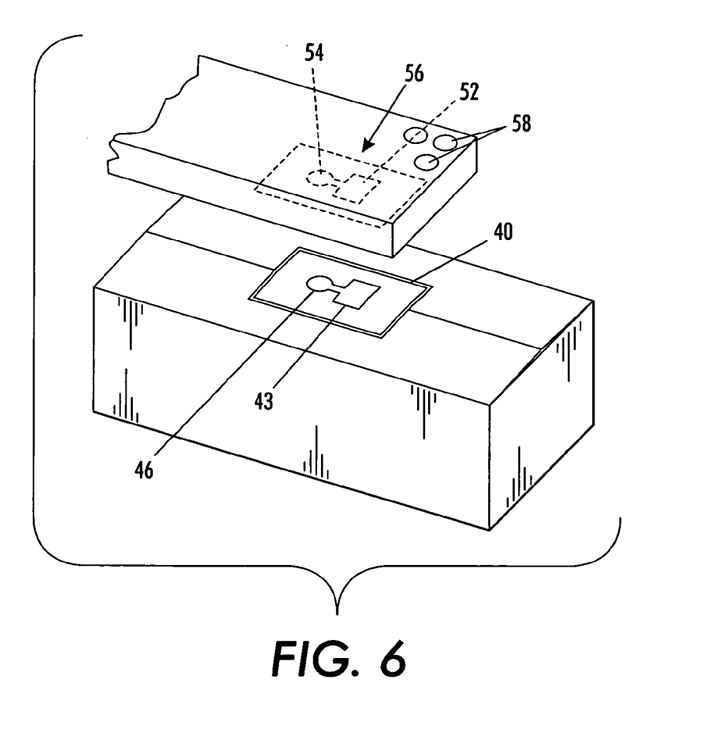
FIG. 6 shows the use of a fixed tag writer or reader in accordance with another aspect of the present invention.

Referring next to FIGS. 5 and 6, the tag can be programmed by writing information into the tag memory after the module has been enclosed in the container and the tag securely affixed to the container. As shown in FIG. 5, with the module in the container, and the tag affixed to the container, a hand held tag writer 50 is brought into proximity with the tag on the container. The tag writer includes writer electronics 52 and a writer communication element 54, such as an RF antenna, that transmits a signal, which is received by the RF antenna 46 of the tag. The signal from the tag writer contains information of a predetermined type, which information is thereby received by the tag, and stored in the tag memory 44. An exemplary handheld tag writer is described more fully in U.S. patent application Ser. No. 10/849,686 entitled "Portable Analytical Device for Programmable Tags," filed concurrently herewith by Heiko Rommelmann et al., the contents of which are hereby incorporated by reference.

In other implementations, the container enclosing the module, with the tag securely affixed to the container, passes near a fixed tag writer 56 as shown in FIG. 6. The fixed tag writer also includes writer electronics 52, and a writer communication element 54, such as an RF transmitting antenna that transmits an RF signal, which is received by the tag antenna 46. The signal transmitted by the writer RF antenna is sufficient to energize the antenna and circuitry of the tag, so that the tag receives the information containing signal, and stores the information in the tag memory 44.

Using RF signals allows the tag antenna to receive information from either the handheld tag writer of FIG. 5 or the fixed tag writer of FIG. 6 even if there is not a line of sight relationship between the tag and the tag writer.

The tag writer 50, 56 can selectively transmit first or second module information for programming the electronic tag 40. Various mechanisms can be used for selecting the module information to be transmitted by the tag writer. In one example, the tag writer can be provided with a plurality of buttons 58. A user pressing one button causes the tag writer to program the tag with the first module information, while pressing a second button causes the tag writer to program the tag with the second module information. More than two buttons may be included to provide additional selectivity. Persons skilled in the art will identify other mechanisms for providing selectivity of programming. One example is an external device, such as a computer (not shown) in communication with the tag writer. Another example is a toggle or rotary switch on the tag writer.

Persons skilled in the art will recognize after studying the present disclosure that the handheld tag writer 50 and the fixed tag writer 56 can readily be configured to also function as tag readers. In tag reader mode, the writer electronics 52 energize the tag communication element to cause the tag communication element to transmit information from the tag memory 44.

The information transmitted from the tag writer 50, 56 to the tag, and stored in the tag memory can be information pertaining to the module enclosed within the container. Such programming of the tag after the module has been packaged allows for simpler module inventory control in certain circumstances. For example, one particular toner cartridge module may be marketed under several different part numbers and/or pricing models. The part number and pricing of a toner cartridge for a printing apparatus operated on a lease agreement with a maintenance provision may have a different price designation than a toner cartridge intended for a printing apparatus owned by the user or operated without a maintenance agreement. Rather than keeping multiple stocks of modules that are physically identical, but bear different part numbers and/or prices for the different potential uses, a distributor can maintain a single inventory of a particular module, and program the tag with information relevant to its nature or use once that use has been determined, such as when a customer orders the part. Thus, the tag on a container enclosing a module intended for a customer who has paid for an all-inclusive maintenance program can be written as the module in the container leaves the distributor's warehouse with a first set of information identifying it as such. As the container enclosing the module continues along the distribution path, that identity can be tracked with a tag reader that can read the information in the tag memory, to verify that the module does not find its way to an incorrect place. On the other hand, if a module is to be shipped to a customer who pays for supplies individually, the tag memory can be programmed with a second set of different information indicating its status as an individually paid for element.

Tag reader capabilities in the tag writer 50, 56 can be used to authenticate or identify the tag before writing information to the tag. For example, the tag writer/reader 50, 56 can read identification information from the electronic tag 40. Such reading can take place by having the tag writer/reader transmit an identification request signal through the writer communication element 54. Upon receipt by the tag communication element 46, the identification request causes the tag to formulate and transmit an identification response. The tag reader/writer receives the tag identification response.

For top security, the tag writer/reader can verify the authenticity or identity of the tag by comparing the tag identification response with predetermined identification criteria. The tag writer/reader can be configured to program the tag only if the tag writer/reader verifies the authenticity or identity of the tag. In some implementations, the tag writer may be adopted to program certain module information into a tag only if the tag identification information matches a first identification criteria, and to program different module information into the tag only if the tag identification information matches a second identification criteria.

Figure 7:
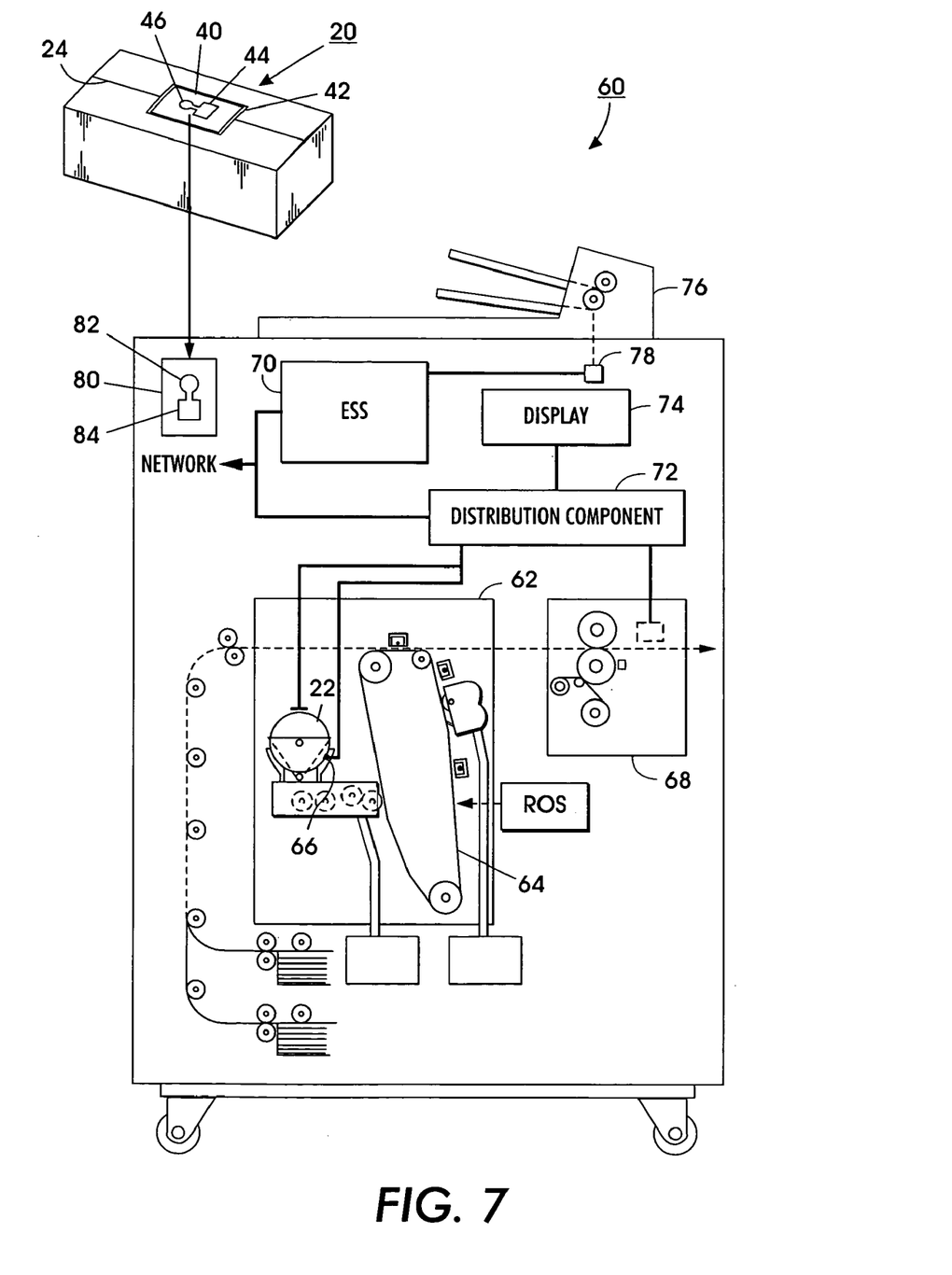
FIG. 7 is a schematic illustration of a printing apparatus incorporating an aspect of the present invention.

FIG. 7 shows a representative printing apparatus 60 that might use the module 22 enclosed within the container 20. The representative printing apparatus includes a printing subsystem 62. In the illustrated example, the printing subsystem is a xerographic printing subsystem that includes a photoreceptor 64, and a developer 66. A toner cartridge, such as the toner cartridge module 22 enclosed within the container, is inserted into the printing subsystem. The developer draws toner from the toner cartridge into the developer. The printing apparatus additionally includes a fuser subassembly 68, an electronic subsystem 70 for processing control signals, and a distribution component 72 for controlling the distribution of electronic signals from the electronic subsystem to the printing subassembly and the fusing subassembly. The distribution components may also deliver information to a graphical display 74 for conveying information to the machine user. The printing apparatus may include a copying function, in which case a document handler 76 passes documents past a scanner 78.

The printing apparatus includes a tag reader 80 that includes a wireless communication element 82 for receiving information transmitted by the communication element 46 of the tag 40. The tag reader on the printing apparatus includes reader electronics 54 and an RF antenna forming the communication element 82. The RF antenna emits radio frequency signals of sufficient strength to energize the RF antenna on the tag when the tag is brought into proximity with the tag reader. Upon energizing the RF tag antenna, the tag transmits the information stored in the tag memory. The antenna on the tag reader receives that information, and transmits it to the electronic subsystem 70 of the printing apparatus. The electronic subsystem 70 analyzes the information received from the tag 40 to verify that the information indicates that the module enclosed in the container is appropriate for the particular printing apparatus. For example, the electronic subsystem may verify that the tag information indicates that the module is intended for a printing apparatus with the appropriate type of maintenance agreement that covers the printing apparatus. In an alternative, the electronic subsystem may use the information from the tag 40 on the container to determine the type of material in the container. The electronic subsystem 70 may be configured to perform various actions depending on the information received. For example, the information received from the tag may indicate to the electronic subsystem how the printer should be configured to take advantage of the module contained in the container. The electronic subsystem can also be configured to issue a notice on the display if the information read from the tag memory indicates that an incorrect module is being presented to the printing apparatus. The electronic subsystem may even be programmed to block insertion of the module into the printing apparatus if the information read from the tag memory does not agree with the expected information.

Once the tag reader 80 has read the information, and informed the user through the display 74 that the module is appropriate for insertion, the user can open the container 20 by expanding the opening separation 24. With the tag 40 embedded in a label 42 spanning the opening separation, the act of expanding the opening separation damages or destroys the tag. So damaging or so destroying the tag prevents an unscrupulous user from reusing the tag to apply to a different module.

Information can be added to the tag memory at different times. Thus, certain information, such as the physical configuration of the module enclosed within the container, may be stored in the tag memory at one time, such as upon placing the module in the container. Additional information, such as the marketing part number, may be added at a later time. Yet additional information, such as tracking information indicating a particular distributor warehouse, the particular service technician who installs the module, or other information can be added at later times. Thus, tracking information can be stored in the tag memory attached to the container, so that the container itself retains a history of where it has been, and what steps have performed upon it. In this way, a subsequent tag reader can access this information and identify the history of the container enclosing the module, without requiring that the tag reader access a central tracking system.

Figure 8:
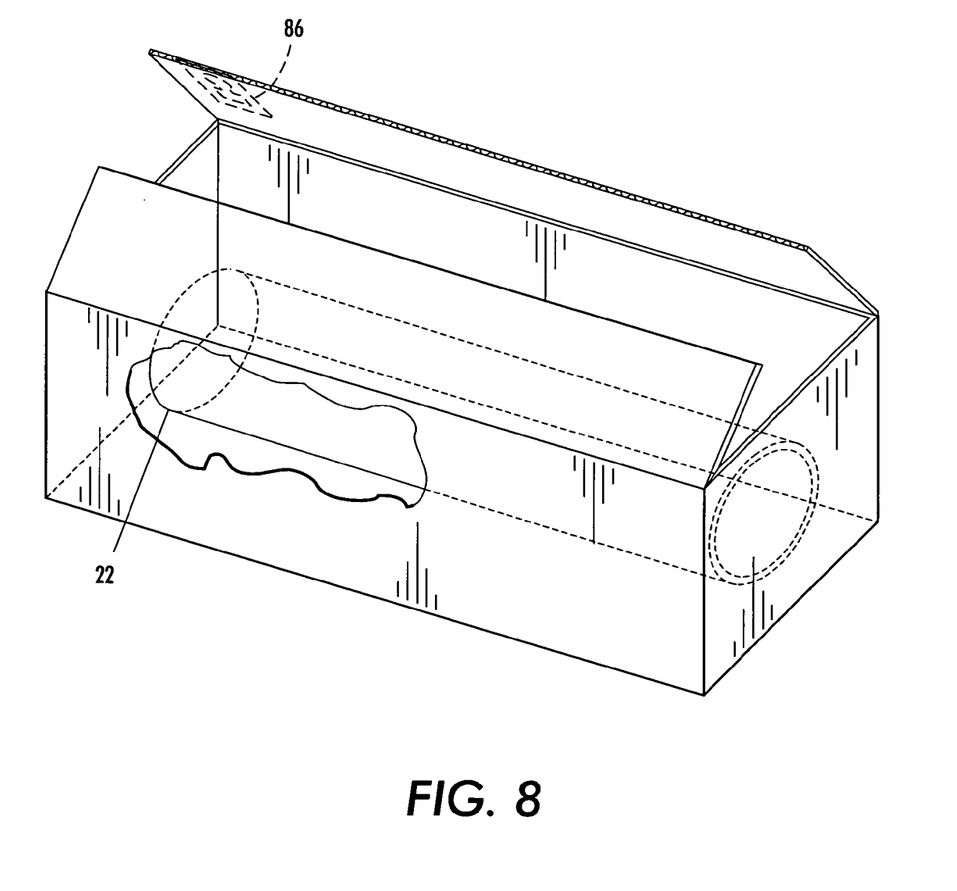
FIG. 8 illustrates a container with another implementation of an aspect of the invention.

FIG. 8 illustrates an implementation in which a radio frequency tag is embedded in the packaging material forming the container. Such an implementation is particularly advantageous when the container is formed of corrugated cardboard. The corrugated cardboard provides space into which the tag containing the wireless communication element, such as an RF antenna, and a tag memory can be embedded. The tag memory in the embedded tag can still be written to and read from by various tag writers and readers, as with the label tag described above.

While the invention has been described in the context of particular implementations, those skilled in the art, after studying the present disclosure, will recognize that various modifications can be made without departing from the spirit of the invention. Such modifications may include different configurations for the tag, different types of tag writers and readers, and different placement of the tag on a container. In addition, the module enclosed within the container can be a module other than a toner cartridge, and may include any type of replaceable module for a printing apparatus. Furthermore, the tag can be used for modules other than replaceable modules for printing apparatus. Therefore, the scope of the invention is not to be limited to the specific implementations described above.

We claim:

1. A method of processing a module, the method comprising:
    enclosing the module within a container;
    securely affixing to the container an electronic tag comprising a tag memory;
    electronically reading tag identification information from the tag memory of the electronic tag securely affixed to the container;
    electronically verifying that the read tag identification information matches predetermined identification criteria; and
    if the read tag identification information matches the predetermined identification criteria, selectively storing in the tag memory either first module information or second module information, which module information pertains to a subsequent use of the module.

2. The method of claim 1, wherein electronically reading the tag identification information comprises:
    transmitting an identification read request signal to the electronic tag; and
    electronically receiving an identification response from the electronic tag.

3. The method of claim 1, wherein selectively storing in the memory comprises selectively communicating over a wireless communication link to a tag communication element on the electronic tag either the first module information or the second module information.

4. The method of claim 1, wherein securely affixing the electronic tag to the container comprises embedding the electronic tag in the material forming the container.

5. The method of claim 1, wherein securely affixing the electronic tag to the container comprises securing the electronic tag to the container with adhesive.

6. The method of claim 5, wherein securing the electronic tag to the container with adhesive comprises securing the electronic tag over a container opening separation adapted to expand upon opening the container.

7. A container for enclosing a module, the container comprising:
    an enclosure; and
    an electronic tag securely affixed to the enclosure;
    wherein the electronic tag includes a tag memory, a tag identification segment for producing a tag identification response, and a tag communication element in communication with the tag memory and the tag identification segment;
    wherein the tag communication element is adapted to receive information from a source and to transmit tag identification responses generated by the tag identification segment;
    wherein the tag memory is adapted to store the information received by the tag communication element;
    wherein the tag memory is adapted to store at least first and second module information pertaining to the module to be enclosed in the container; and
    wherein the tag identification segment calculates the tag identification response in response to a request received at the communication element.

8. The container of claim 7, wherein the tag identification segment is a portion of the tag memory.

9. The container of claim 7, wherein the electronic tag is embedded in material forming the container enclosure.

10. The container of claim 7, wherein the electronic tag is embedded in a label secured to the container enclosure.

11. The container of claim 10, wherein:
    the container enclosure includes an opening separation adapted to expand upon opening the container; and
    the electronic tag spans the opening separation.

* * * * *